United States Patent
Kakinami

(10) Patent No.: US 8,269,848 B2
(45) Date of Patent: Sep. 18, 2012

(54) CAMERA CALIBRATION METHOD AND CAMERA CALIBRATION DEVICE

(75) Inventor: Toshiaki Kakinami, Nagoya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 966 days.

(21) Appl. No.: 11/791,282

(22) PCT Filed: Nov. 7, 2005

(86) PCT No.: PCT/JP2005/020345
§ 371 (c)(1), (2), (4) Date: May 22, 2007

(87) PCT Pub. No.: WO2006/057147
PCT Pub. Date: Jun. 1, 2006

(65) Prior Publication Data
US 2008/0031514 A1    Feb. 7, 2008

(30) Foreign Application Priority Data
Nov. 24, 2004    (JP) ................................. 2004-338557

(51) Int. Cl.
*H04N 5/228* (2006.01)
(52) U.S. Cl. ..................................... 348/222.1; 382/105
(58) Field of Classification Search ............... 348/222.1; 382/105
See application file for complete search history.

(56) References Cited

U.S. PATENT DOCUMENTS

| 6,785,404 B1 * | 8/2004 | Shimazaki et al. ........... 382/104 |
| 6,813,371 B2 | 11/2004 | Kakinami |
| 2001/0006554 A1 | 7/2001 | Kakinami |
| 2004/0125207 A1 * | 7/2004 | Mittal et al. .................. 348/169 |
| 2006/0164517 A1 | 7/2006 | Lefebure |

FOREIGN PATENT DOCUMENTS

| EP | 1 094 668 A2 | 4/2001 |
| JP | 8-161424 A | 6/1996 |
| JP | 2001-187552 A | 7/2001 |
| JP | 2001-245326 A | 9/2001 |
| JP | 2002-87160 A | 3/2002 |
| WO | 03/100713 A3 | 12/2003 |

OTHER PUBLICATIONS

New technology for calibration of CCD camera parameters, Fajie Duan et al., ACTA Metrologica Sinica, vol. 18, No. 4, Oct. 1997.

(Continued)

*Primary Examiner* — Yogesh Aggarwal
(74) *Attorney, Agent, or Firm* — Sughrue Mion, PLLC

(57) ABSTRACT

Planar calibration indices (c1) including coordinate information of at least four points are placed on a first plane (S1), and an image plane of the camera image including the calibration indices is input as a second plane (S2). Points (c2) existing on the second plane and corresponding to predetermined portions of the calibration indices are specified, and homography between the first plane and the second plane is computed, on the basis of the corresponding relationship of the at least four points included commonly in the first plane and the second plane, so that the camera image is calibrated. For example, a device is mounted on a vehicle, and four points, whose arrangement on a plane in 3D space is known, are used as calibration indices, and corresponding four points on the camera image, which correspond to them respectively, is achieved automatically.

19 Claims, 14 Drawing Sheets

OTHER PUBLICATIONS

Chaofu Wu, et al. Linear theory and algorithm: A New Theory and Algorithm of Linear Camera Self Calibration, Chinese J. Computers, vol. 24, No. 11, Nov. 2001.

A camera calibration method for stereoscopic vision measurement, Ling Sha et al., Mechanic Manufacture, vol. 41, No. 465, May 2003.

A New method on single View Metrology, Huang Feng-Rong et al., vol. 30, No. 4, Jul. 2004.

Zhegyou Zhang: "Flexible camera calibration by viewing a plane from unknown orientations" Computer Vision, 1999. The Proceedings of the Seventh IEEE International AL Conference on Kerkyra, Greece, Sep. 20-27, 1999, pp. 666-673 (XP010350391) ISBN: 978-0-7695-0164-2.

Japanese Office Action dated Jun. 24, 2008.

Takagi, M., "Handbook of Image Analysis", Japan, Zaidan-houjin Tokyo daigku shuppankai, May 31, 1993, first issue, fifth print, pp. 427-428.

Robert Luc, "Camera calibration without Feature Extraction", Institute National de Recherche en Informatique Automatique, Feb. 1994, p. 1-21, No. 2204.

Robert Y. Tsai, "An Efficient and Accurate Camera Calibration Technique for 3D Machine Vision", Proceedings of IEEE Conference on Computer Vision and Pattern Recognition, 1986, p. 364-374, Miami Beach, FL.

Jun Satoh, "Computer vision", Computer Vision—Geometry of Vision, Oct. 10, 2001, p. 11-41, Corona Publishing Co., Ltd. Tokyo, Japan.

Andrew Zisserman, Geometric Framework for Vision I: Single View and Two-View Geometry, Robotics Research Group, Apr. 16, 1997, p. 1-46, University of Oxford.

Richard Hartley et al., "Multiple View Geometry in Computer Vision", Aug. 2000, p. 11-16, Cambridge University Press.

\* cited by examiner

CAMERA CALIBRATION METHOD AND CAMERA CALIBRATION DEVICE

TECHNICAL FIELD

The present invention relates to a camera calibration method and a camera calibration device, and particularly relates to the camera calibration method and camera calibration device for performing calibration to a camera image by a camera for projecting 3D space onto 2D image.

BACKGROUND ART

As for a camera calibration method, various proposals have been made heretofore, one of which is known as a method for computing camera parameters, by placing a featured three-dimensional object, whose configuration has been known in advance, in 3D space, as an index for calibration, and determining how featured points of the three-dimensional object are indicated on a camera image coordinate system.

For instance, in Non-patent document 1, there is disclosed a method for computing camera parameters with 11 degrees of freedom, by means of calibration indices for the featured three-dimensional object. In this respect, proposed is a method for determining calibration camera parameters in the 3D space, by placing the featured three-dimensional object on a position where an image of the featured three-dimensional object can be taken by a camera, and geometrically computing a point, on which the three-dimensional object is indicated in the camera coordinate system. However, according to the method for performing the camera calibration after the camera was installed on the vehicle, as described above, in the case where the object to be calibrated is the camera mounted on the vehicle, the calibration will be performed on vehicle assembling lines in a plant or the like. In a production site, a good workability shall be requisite. In the production site, if the method for performing the calibration by placing the featured three-dimensional object is employed, it is ineffective to place the three-dimensional object as the calibration index, in each calibration. In view of preventing an accident, it is desirable to avoid placing the three-dimensional object to be used for calibration at workers' feet. With respect to the calibration index for performing the camera calibration, it is also desirable to select the index that should not cause a problem, even if the workers put their feet on it, such as a pattern painted on a floor in the plant.

In view of the above problem, in Patent document 1, there are proposed a device and a method to be capable of performing the camera calibration according to a simple process, even if the camera calibration is performed in the vehicle production site or the like. And, there is disclosed a method for enabling the camera calibration to be performed in the vehicle assembling lines, with the calibration indices being provided to enable the camera parameters to be set such that they can be displayed at arbitrary points on the image.

Also, in Non-patent document 2, like the method as described in the above Non-patent document 1, there is proposed the method for computing camera parameters in 3D space, by placing the featured three-dimensional object on the position where the image of the featured three-dimensional object can be taken by a camera, and geometrically computing the point, on which the three-dimensional object is indicated on the camera coordinate system.

Furthermore, in the following Non-patent documents 3-5, there are disclosed technical information such as image processing techniques, on which the present invention based, and which will be described later, when explaining the embodiment of the present invention.

Patent document 1:
Japanese Patent Laid-open Publication No. 2001-245326
Non-patent document 1:
Pages 1-21 of "Camera calibration without Feature Extraction" written by Luc Robert, published by Institute National de Recherche en Informatique Automatique, Research Report No. 2204, issued in February 1994
Non-patent document 2:
Pages 364-374 of "An Efficient and Accurate Camera Calibration Technique for 3D Machine Vision" written by Roger Y. Tsai, Proceedings of IEEE Conference on Computer Vision and Pattern Recognition, Miami Beach, Fla., issued in
Non-patent document 3:
Pages 11-41 of "Computer vision" written by Jun Satoh, first issue, third print, published by Corona-Sha, on October 10, 2001
Non-patent document 4:
"Geometric Framework for Vision I: Single View and Two-View Geometry" written by Andrew Zisserman, issued by Robotics Research Group, University of Oxford, on Apr. 16, 1997, <URL:http://homepages.inf.ed.ac.uk/rbf/CVonline/LOCAL_COPIES/EPSRC_SSAZ/epsrc_ssaz.html> retrieved on Sep. 3, 2004
Non-patent document 5:
Pages 11-16 of "Multiple View Geometry in Computer Vision" written by Richard Hartley and Andrew Zisserman, published by Cambridge University Press., in August, 2000

DISCLOSURE OF THE INVENTION

Problems to be Solved by the Invention

However, according to the camera calibration method as described in the Patent document 1 as cited above, since it is prerequisite that those other than the rotation component of camera extrinsic parameters are known, and that the value provided in advance is used, tolerance and error will be remained in the value. Therefore, if the value is employed as it is, the error will be remained in the value transformed by projection using the calibrated parameters. Furthermore, also in the Patent document 2, since it is prerequisite that camera intrinsic parameters and extrinsic parameters are known by some calibration methods, the same problem as the one caused by the method described in the Patent document 1 could be caused.

Accordingly, it is an object of the present invention to provide a camera calibration method which can perform camera calibration appropriately, without requiring any information relating to not only camera intrinsic parameters but also extrinsic parameters.

Furthermore, it is another object of the present invention to provide a camera calibration device which can perform camera calibration appropriately, without requiring any information relating to not only camera intrinsic parameters but also extrinsic parameters, and further provide the camera calibration device which can be mounted on a vehicle.

Means for Solving the Problems

In accomplishing the above-described object, in a camera calibration method for performing calibration to a camera image taken by a camera for projecting three-dimensional space onto two-dimensional image, the present invention is constituted by placing planar calibration indices including coordinate information of at least four points on a first plane, inputting an image plane of said camera image including said calibration indices as a second plane, specifying points existing on said second plane and corresponding to predetermined portions of said calibration indices, and computing homography between said first plane and said second plane, on the basis of the corresponding relationship of said at least four points included commonly in said first plane and said second plane, to calibrate the camera image.

In the above-described camera calibration method, furthermore, at least one of specific marks and straight line patterns may be placed on said first plane, to provide said calibration indices. Also, the points corresponding to the predetermined portions of said calibration indices may be specified by means of at least one of straight lines, intersections, and a combination of the straight lines and intersections.

And, a camera calibration device according to the present invention is constituted to comprise calibration index means for placing planar calibration indices including coordinate information of at least four points on a first plane, image input means for inputting an image plane of said camera image including said calibration indices as a second plane, corresponding points specifying means for specifying points existing on said second plane and corresponding to predetermined portions of said calibration indices, and homography computing means for computing homography between said first plane and said second plane, on the basis of the corresponding relationship of said at least four points included commonly in said first plane and said second plane. It this camera calibration device, said calibration index means may place at least one of specific marks and straight line patterns on said first plane, to provide said calibration indices. Furthermore, said corresponding points specifying means may specify the points corresponding to the predetermined portions of said calibration indices by means of at least one of straight lines, intersections, and a combination of the straight lines and intersections. Especially, said camera, said image input means, said corresponding points specifying means, and said homography computing means may be mounted on a vehicle.

Furthermore, the camera calibration device may be constituted to comprise calibration index means for placing planar calibration indices including coordinate information of at least four points on a first plane, display means for displaying an image plane of said camera image including said calibration indices as a second plane, marker display means for superimposing predetermined markers on said display means, adjusting means for varying the position of said marker display means on the image coordinate taken by said camera, to adjust the positions of said markers to be matched with predetermined portions of said calibration indices, corresponding points specifying means for specifying the points corresponding to the predetermined portions on said first plane within said second plane, when said markers are matched with said calibration indices, and homography computing means for computing homography between said first plane and said second plane, on the basis of the corresponding relationship of said at least four points included commonly in said first plane and said second plane.

And, the camera calibration device including the abode-described marker display means may be mounted on a vehicle, and said calibration indices may be placed on left and right sides with respect to a main axis passing a center of said vehicle. In this case, said calibration indices may include known four points on a coordinate system based on said vehicle. For example, said calibration indices may provide said four points to form diced patterns on said first plane, or may include light sources disposed at said four points on said first plane. Furthermore, as for said calibration indices, four points provided at four corners of a parking lot for parking Said Vehicle Can Be Employed.

Effects of the Invention

As the present invention is constituted as described above, the following effects will be achieved. That is, according to the above-described camera calibration method, since it is so constituted to employ the four points whose arrangement on the plane in the three-dimensional space are known, as the calibration indices, and obtain the transforming relationship of the four points between two images by the homography, the camera extrinsic parameters such as the camera focal length, original position or the like, may be unknown, and also the camera extrinsic parameters may be unknown, so that calibration at high accuracy can be practiced by the easy method.

Also, according to the above-described camera calibration device, since it is so constituted to employ the four points whose arrangement on the plane in the three-dimensional space are known, as the calibration indices, and perform corresponding the four points between two images by the homography, even if both of the camera intrinsic parameters and extrinsic parameters were unknown, the four points on the camera image could be recovered appropriately, as the four points on the plane in the original three-dimensional space. In this case, since the camera intrinsic parameters such as the camera focal length, original position or the like, may be unknown, and also the camera extrinsic parameters, which correspond to information of the position and behavior of the camera in the three-dimensional space, may be unknown, the requisites for mounting or installing the camera will be eased. Furthermore, the above-described camera calibration device can be the one to be mounted on a vehicle. In this case, it is possible to employ the four points whose arrangement on the plane in the three-dimensional space are known, as the calibration indices, and automatically perform corresponding the four points between two images by the corresponding points specifying means, to achieve the camera calibration appropriately.

Particularly, according to the camera calibration device including the above-described marker display means, it is possible to employ the four points whose arrangement on the plane in the three-dimensional space are known, as the calibration indices, and manually perform corresponding the four points between two images, to achieve the camera calibration appropriately. And, if the calibration device is mounted on the vehicle, and the calibration indices are placed on left and right sides with respect to the main axis passing the center of the vehicle, various types of the calibration indices can be provided. For example, they may be constituted by including the known four points in the coordinate system based on the vehicle, and the four points may form diced patterns on the first plane, or an embodiment with light sources disposed at the four points on the first plane may be employed. Furthermore, there can be constituted an embodiment for employing the four points provided at the four corners of a parking lot for parking the vehicle.

DESCRIPTION OF CHARACTERS

CM: camera
IM: image input means
HM: homography computing means
ID: corresponding points specifying means
DS: display means
MK: marker indication means
AJ: adjusting means
SY: synchronous separation circuit
FM: frame memory
VC: image processing section

BEST MODE FOR CARRYING OUT THE INVENTION

Figure 17:
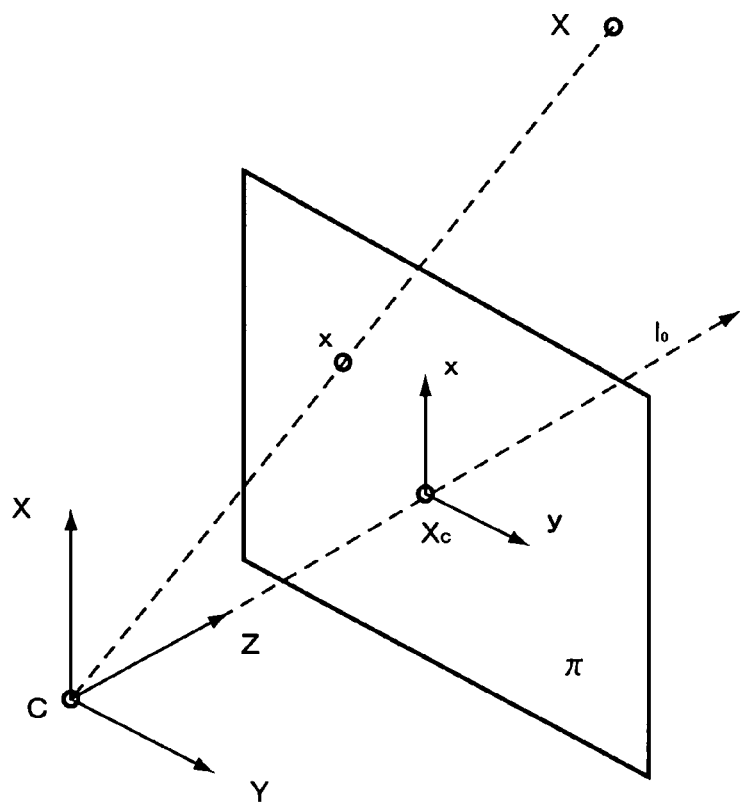
FIG. 17 is a diagram showing perspective projection according to a conventional camera technique.

A practical embodiment of the camera calibration method of the present invention as constituted above will be explained hereinafter with reference to the drawings. First of all, a camera technique provided as a background of the present invention is explained referring to FIGS. 17-20, thereafter the embodiment of the present invention will be explained referring to FIGS. 1 and 2. At the outset, a camera coordinate system is defined as shown in FIG. 17. That is, as explained in the Non-patent document 3, an optical center (C) of a camera is provided as an origin of coordinates, X-axis and Y-axis of 3D coordinates are provided to be in parallel with x-axis and y-axis on the image plane, respectively, and z-axis is provided to be in parallel with an optical axis ($l_0$). The straight line ($l_0$) drawn from the optical center (C) perpendicularly to the image plane π is called as an "optical axis", and a point of intersection (xc) of the optical axis and the image plane is called as a "principal point".

In FIG. 17, a point $X=[X,Y,Z]^T$ having coordinates (X,Y,Z) in 3D space is projected onto a point $x=[x,y]^T$ on 2D image. The large characters such as "X" represent the three-dimension, and the small characters such as "x" represent the two-dimension. And, "$^T$" indicates a transposed matrix. Provided that a focal length (f) is 1 (i.e., f=1), and that the point on the 2D image in FIG. 17 is deemed as the point in the 3D space, its position is indicated by (x,y,1). As apparent from FIG. 17, according to the projection by the camera, the ratio between the "x" and "f" of the point on the 2D image is equal to the ratio between the "X" and "Z" of the point in the 3D space, and the ratio between the "y" and "f" is equal to the ratio between the "Y" and "Z". Therefore, between the point in the 3D space and the projected image thereof, the following [Equation 1] is given, and this projection is called as a "perspective projection".

$$x = \frac{X}{Z}, \quad y = \frac{Y}{Z} \quad \text{[Equation 1]}$$

The perspective projection of the above-described [Equation 1] can be represented by means of homogeneous coordinates in the form of matrix operation, as represented by the following [Equation 2].

$$\lambda \begin{bmatrix} x_1 \\ x_2 \\ x_3 \end{bmatrix} = \begin{bmatrix} 1 & 0 & 0 & 0 \\ 0 & 1 & 0 & 0 \\ 0 & 0 & 1 & 0 \end{bmatrix} \begin{bmatrix} X_1 \\ X_2 \\ X_3 \\ X_4 \end{bmatrix} \quad \text{[Equation 2]}$$

In the [Equation 2], "λ" is an arbitrary real number, and the [Equation 2] represents the same projection as the equation of [Equation 1]. Then, the [Equation 2] may be simplified by the following [Equation 3].

$$\lambda \tilde{x} = P_f \tilde{X} \qquad \text{[Equation 3]}$$

In the [Equation 3], "Pf" is indicated by the following [Equation 4].

$$P_f = \begin{bmatrix} 1 & 0 & 0 & 0 \\ 0 & 1 & 0 & 0 \\ 0 & 0 & 1 & 0 \end{bmatrix} \qquad \text{[Equation 4]}$$

With respect to the image data processed in the computer, where its origin is placed, and granularity and aspect ratio for the pixel coordinate value are varied depending on a design. That is, the image data processed in the computer is based upon image coordinates for each pixel, irrespective of physical quantity or positions. Therefore, in the case where an actual camera is modeled, its physical coordinate (x) is required to be transformed into the image coordinate (m). This transformation is a combination of parallel translation for placing the origin, horizontal and vertical scale transformation, and scale transformation dependent on the focal length, to be represented as follows.

$$\tilde{m} = A\tilde{x} \qquad \text{[Equation 5]}$$

In this respect, the former part of the above [Equation 5] is represented by $[m_1, m_2, m_3]^T$, and corresponds to the homogeneous coordinates of the image coordinates $m=[u,v]^T$, to be set, such that equivalence relation as indicated by the following [Equation 6] can be achieved. That is, $u=m_1/m_3$, and $v=m_2/m_3$ are set.

$$\begin{bmatrix} m_1 \\ m_2 \\ m_3 \end{bmatrix} \approx \begin{bmatrix} u \\ v \\ 1 \end{bmatrix} \qquad \text{[Equation 6]}$$

"A" is a matrix for transforming the physical coordinate (x) into the image coordinate (m), and it can be indicated by the following [Equation 7], with the focal length (f), coordinates of the principal points $[u_0, v_0]$, scale factors $k_u$, $k_v$ in the directions of (u) and (v), and shear coefficient ($k_s$), which is a coefficient for causing such deformation (shear deformation) that maintains a parallel property, but does not maintain a vertical property.

$$A = \begin{bmatrix} fk_u & fk_s & u_0 \\ 0 & fk_v & v_0 \\ 0 & 0 & 1 \end{bmatrix} \qquad \text{[Equation 7]}$$

According to the above [Equation 3] and [Equation 5], the point (X) in the 3D space is projected onto the pixel (m) on the 2D image, as indicated by the following [Equation 8]. Where, "A" is called as a "camera calibration matrix", and, in more detail, it is called as a "camera intrinsic parameters matrix", because it is the matrix formed by the camera intrinsic parameters, as apparent from the above [Equation 7].

$$\lambda \tilde{m} = AP_f \tilde{X} \qquad \text{[Equation 8]}$$

Figure 18:
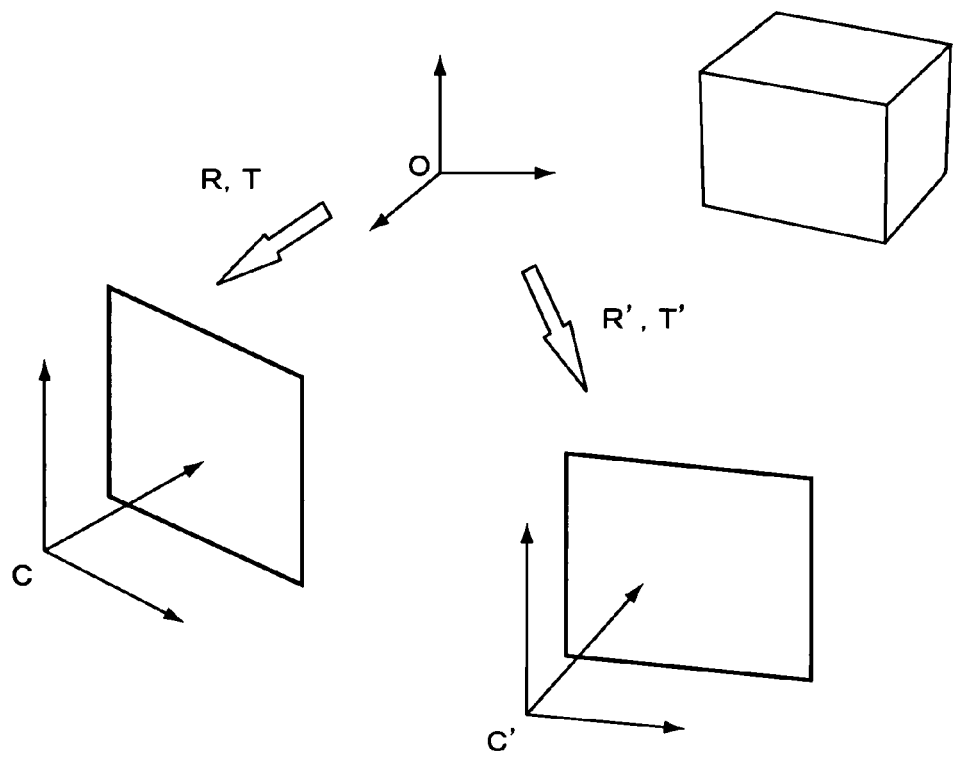
FIG. 18 is a diagram showing a relationship between camera coordinates and world coordinates according to a conventional camera technique.

Next, in the case where relationships among a plurality of cameras, and a single camera moving toward plurality of positions, or the relationship between the camera and objects are taking into consideration, a reference coordinate system may be provided. In this case, the coordinates determined commonly to the number of cameras or places thereof to be considered, and objects, as shown in FIG. 18, are defined as "world coordinates". The world coordinates (indicated by $X_w$) may be transformed by 3D rotation (R) and translation (T) to the camera coordinates (X), according to the following [Equation 9].

$$X = RX_w + T \qquad \text{[Equation 9]}$$

The 3D rotation (R) and translation (T) include the rotations about X-axis, Y-axis, Z-axis, $\theta_x$, $\theta_y$, $\theta_z$, and the translations along the X-axis, Y-axis, Z-axis, $T_x$, $T_y$, $T_z$, respectively, to be represented by the following [Equation 10] and [Equation 11], respectively.

$$R = \begin{bmatrix} 1 & 0 & 0 \\ 0 & \cos\theta_X & -\sin\theta_X \\ 0 & \sin\theta_X & \cos\theta_X \end{bmatrix} \begin{bmatrix} \cos\theta_Y & 0 & \sin\theta_Y \\ 0 & 1 & 0 \\ -\sin\theta_Y & 0 & \cos\theta_Y \end{bmatrix} \begin{bmatrix} \cos\theta_Z & -\sin\theta_Z & 0 \\ \sin\theta_Z & \cos\theta_Z & 0 \\ 0 & 0 & 1 \end{bmatrix} \qquad \text{[Equation 10]}$$

$$T = \begin{bmatrix} T_X \\ T_Y \\ T_Z \end{bmatrix} \qquad \text{[Equation 11]}$$

The above-described [Equation 9] can be represented by means of the homogeneous coordinates, according to the following [Equation 12].

$$\tilde{X} = M\tilde{X}_w \qquad \text{[Equation 12]}$$

Where, "M" is a 4×4 matrix in combination of the rotation (R) and translation (T), and represented by the following [Equation 13]. That is, "M" is the matrix determined by behavior (rotation) and place (translation) to the world coordinates. And, the rotation and translation are called as "camera extrinsic parameters", so that "M" is called as a "camera extrinsic parameters matrix", in contrast with the "A", which is called as a "camera intrinsic parameters matrix".

[Equation 13]

$$M = \begin{bmatrix} R & T \\ O^T & 1 \end{bmatrix} \qquad \text{[Equation 13]}$$

According to the above [Equation 8] and [Equation 12], the point (X) in the 3D space according to the world coordinate system is projected onto the point (m) on the 2D image, as follows.

$$\lambda \tilde{m} = P\tilde{X} \qquad \text{[Equation 14]}$$

In the above [Equation 14], "P" is a 3×4 matrix represented by the following [Equation 15]. In [Equation 14], the world coordinates ($X_w$) have been replaced by "X". However, both of them will be indicated by "X" without making demarcation between the symbols of the world coordinates and camera coordinates.

$$P = AP_f M \qquad \text{[Equation 15]}$$
$$= A[R\ T]$$

Accordingly, the camera model represented by the above [Equation 14] is called as a "perspective camera model". And, "P" is called as a "perspective camera matrix", which is formed by the camera intrinsic parameters and extrinsic parameters. Therefore, if the (P) is obtained, this can be divided into (A), (R), (T). Then, if the (A), (R), (T) are known, i.e., (P) is known, the camera is treated such that its calibration has been finished. If they are unknown, it is concluded that the camera calibration has not been finished. Therefore, obtaining the (A), (R), (T) is called as the "camera calibration".

According to the above-described "perspective camera matrix", the camera matrix (P) is formed by (A), (R), (T), and it may be generalized by the 3×4 matrix, to provide the following [Equation 16].

$$\lambda \tilde{m} = P_p \tilde{X} \qquad \text{[Equation 16]}$$

The above-described ($P_p$) is formed by the 3×4 matrix as represented in the following [Equation 17]. The camera model generalized by the 3×4 matrix is called as a "projective camera model", and ($P_p$) is called as a "projective camera matrix".

$$P_p = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} \qquad \text{[Equation 17]}$$

As indicated in the above [Equation 17], ($P_p$) is the 3×4 matrix, whose elements count 12. However, since the above [Equation 16] has been represented by the homogeneous coordinates, which should represent the same camera model even if ($P_p$) was multiplied by a constant number, its degree of freedom is not 12, but 11. Accordingly, the "perspective camera" can be generalized by the "projective camera" as described above.

Figure 19:
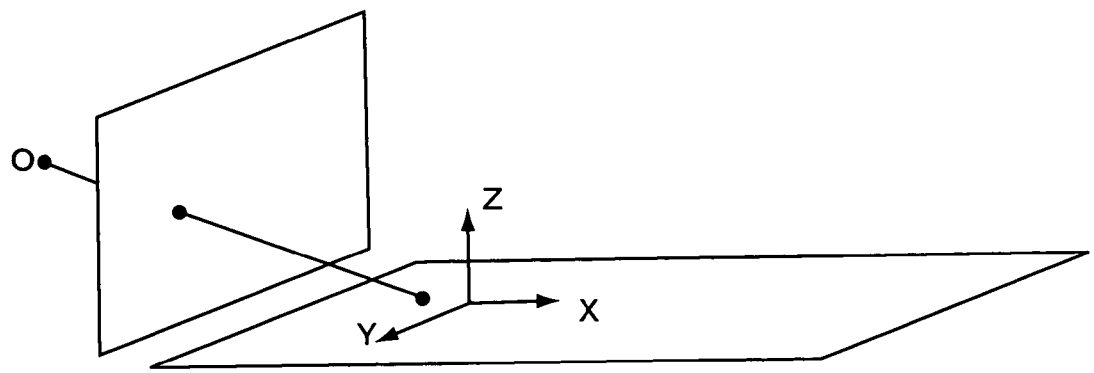
FIG. 19 is a diagram explaining planar projective transformation according to a conventional camera technique.

Next, if the world coordinates are limited to a plane of Z=0, as shown in FIG. 19, the above 3×4 matrix can be simplified to provide a 3×3 matrix as indicated in the following [Equation 18]. This 3×3 matrix represents a general "planar projective transformation" (homography).

$$\begin{bmatrix} x_1 \\ x_2 \\ x_3 \end{bmatrix} = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} \begin{bmatrix} X \\ Y \\ 0 \\ 1 \end{bmatrix} \qquad \text{[Equation 18]}$$
$$= \begin{bmatrix} p_{11} & p_{12} & p_{14} \\ p_{21} & p_{22} & p_{24} \\ p_{31} & p_{32} & p_{34} \end{bmatrix} \begin{bmatrix} X \\ Y \\ 1 \end{bmatrix}$$

Figure 20:
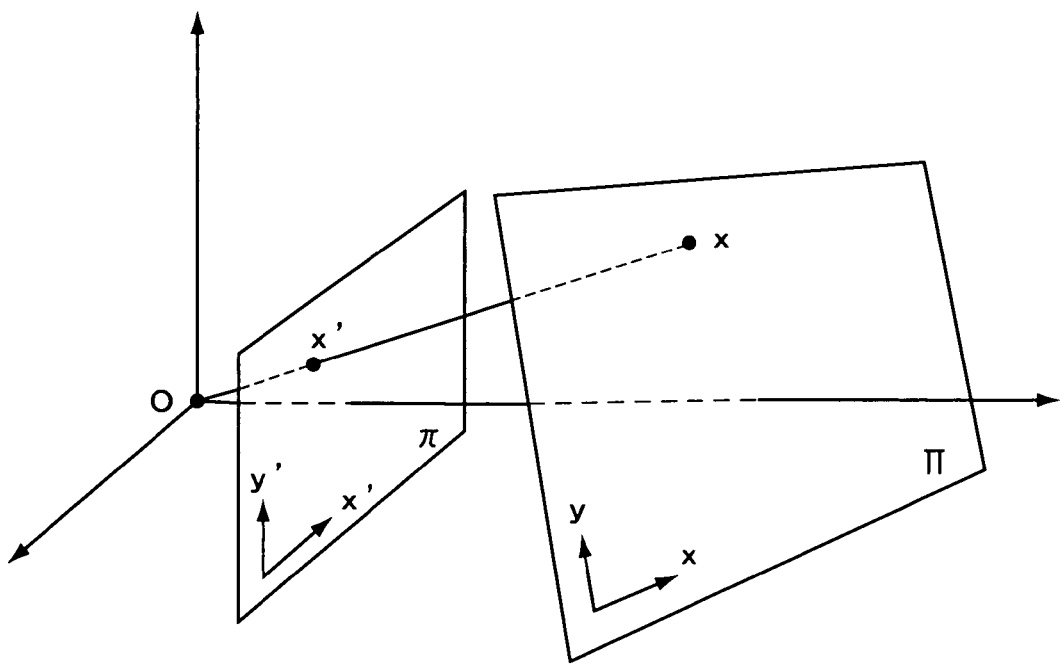
FIG. 20 is a diagram showing a relationship between points on two planes π and Π according to a conventional camera technique.

In this respect, supposing that two planes π and Π are considered as shown in FIG. 20, the relationship between the points (x) and (x') on the respective planes can be represented by the following [Equation 19].

$$\begin{bmatrix} x'_1 \\ x'_2 \\ x'_3 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x_1 \\ x_2 \\ x_3 \end{bmatrix} \qquad \text{[Equation 19]}$$

Or, by means of a 3×3 regular matrix (note: the matrix is not 0), it may be represented by the following [Equation 20], wherein (H) is called as the homography.

$$x' = Hx \qquad \text{[Equation 20]}$$

And, the above [Equation 20] may be represented by the following [Equation 21].

$$x' = \frac{x'_1}{x'_3} = \frac{h_{11}x + h_{12}y + h_{13}}{h_{31}x + h_{32}y + h_{33}}, \qquad \text{[Equation 21]}$$
$$y' = \frac{x'_2}{x'_3} = \frac{h_{21}x + h_{22}y + h_{23}}{h_{31}x + h_{32}y + h_{33}}$$

Furthermore, in each element of the homography (H), two linear equations as indicated by the following [Equation 22] and [Equation 23] are given to corresponding points on each plane. This means that arbitrary four points on a plane can be projectively transformed to four points on another plane.

$$x'(h_{31}x + h_{32}y + h_{33}) = h_{11}x + h_{12}y + h_{13} \qquad \text{[Equation 22]}$$

$$y'(h_{31}x + h_{32}y + h_{33}) = h_{21}x + h_{22}y + h_{23} \qquad \text{[Equation 23]}$$

Figure 1:
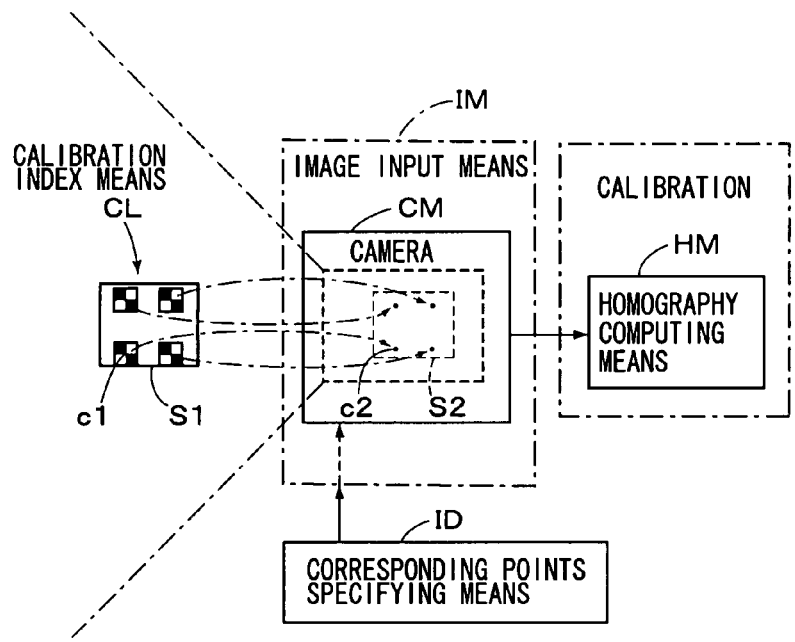
FIG. 1 is a block diagram showing main components of a camera calibration device according to an embodiment of the present invention.

The present invention is provided for computing by means of the homography as described above, to achieve the camera calibration, with its one embodiment shown in FIG. 1. As for the camera (CM) in FIG. 1, any type of it may be employed, as far as the camera is the one for projecting the 3D space onto the 2D image. According to this embodiment, there are provided a calibration index means (CL) which places planar calibration indices (represented by c1) including coordinate information of at least four points on a first plane (S1), image input means (IM) which inputs an image plane of the camera image including the calibration indices (c1) as a second plane (S2), corresponding points specifying means (ID) which specifies points (represented by c2) existing on the second plane (S2) and corresponding to predetermined portions of the calibration indices (c1), and homography computing means (HM) which computes homography between the first plane (S1) and the second plane (S2), on the basis of the corresponding relationship of the at least four points included commonly in the first plane (S1) and the second plane (S2).

With respect to the calibration indices, there is an embodiment for placing at least one of specific marks and straight line patterns on the first plane (S1), to provide the calibration indices (c1), which are explained later with reference to FIGS. 6-8. Furthermore, as for the corresponding points specifying means (ID), there is an embodiment for specifying the points corresponding to the predetermined portions of the calibration indices by means of at least one of straight lines, intersections, and a combination of the straight lines and intersections. By means of the corresponding points specifying means (ID), it is possible to automatically specify the points (c2), which are placed on the second plane (S2), and corresponds to the predetermined portions of the calibration indices (c1). Further, these will be explained later with reference to FIG. 3.

Accordingly, in the camera calibration device as shown in FIG. 1, provided that the four points (cl) whose arrangement on the plane in 3D space are known, are employed as the calibration indices, the four points (c2) on the camera image could be recovered appropriately as the four points (c1) on the plane in the original 3D space, by corresponding the four points (c2) between two images, even if the camera extrinsic parameters were unknown. In this case, since the camera extrinsic parameters which correspond to the information of position and behavior of the camera in the 3D space, such as the height and tilt angle or the like of the camera, are not required, and they may be unknown. Therefore, requirements for positioning and mounting the camera (CM) will be eased, and transforming accuracy between the plane (S2) on the 2D image and the plane (S1) in the 3D space will be improved. Further, this will be explained later with reference to FIG. 12.

Figure 2:
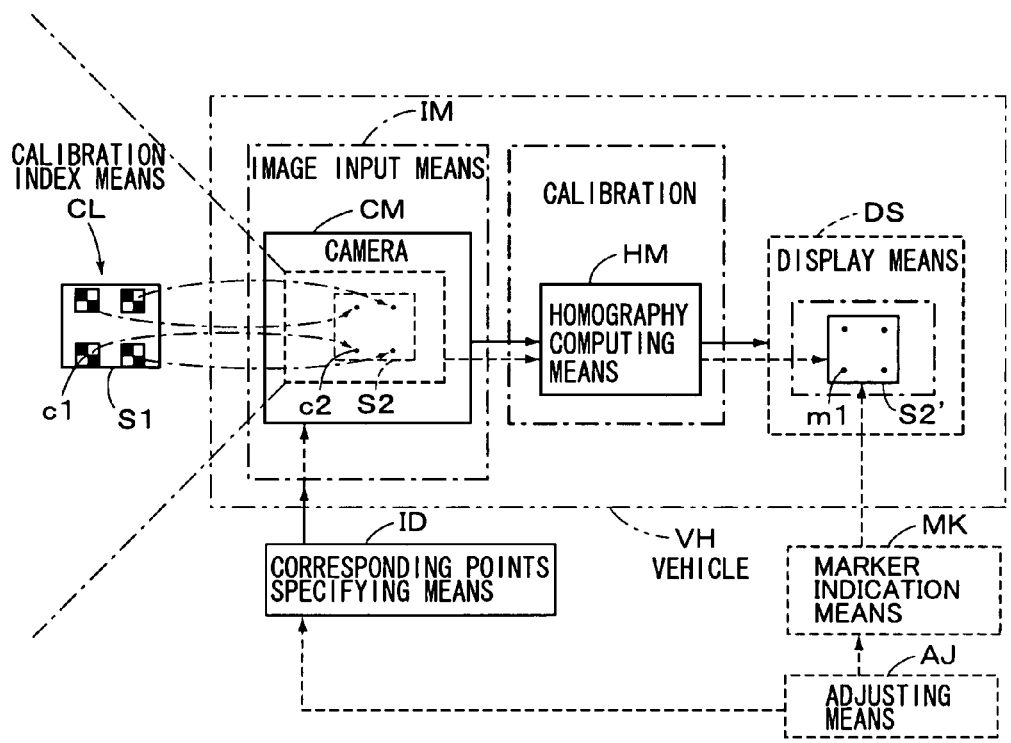
FIG. 2 is a block diagram showing main components of a camera calibration device according to another embodiment of the present invention.

The camera or the like according to the present invention may be mounted on a movable base, in such a manner that the device as shown in FIG. 1 can be mounted as it is, on a vehicle (VH), as shown in FIG. 2, for example. Furthermore, FIG. 2 includes another embodiment, wherein the camera calibration device is mounted on the vehicle. That is, it is provided with calibration index means (CL) which places planar calibration indices (represented by c1) including coordinate information of at least four points on the first plane (S1), and provide with display means (DS) for displaying an image plane of the camera image including the calibration indices (c1) as a second plane (S2'), marker display means (MK) which superimposes at least four predetermined markers (represented by m1) on the display means (DS), adjusting means (AJ) for varying the position of the marker display means (MK) on the image coordinates taken by the camera (CM), as shown by broken lines. In this case, the adjusting means (AJ) is constituted by adjusting the positions of the markers to be matched with the predetermined portions of the calibration indices (c1), and when the markers (m1) are matched with the calibration indices (c1), the points (markers m1) corresponding to the predetermined portions (c1) on the first plane (S1) within the second plane (S2') are specified by the corresponding points specifying means (ID). According to the homography computing means (HM), the homography between the first plane (S1) and the second plane (S2') is computed, on the basis of the corresponding relationship of the at least four points included commonly in the first plane (S1) and the second plane (S2'). Consequently, the points (markers m1) corresponding to the predetermined portions (c1) on the first plane (S1) within the second plane (S2') can be specified manually by the adjusting means (AJ). The practical embodiments of them will be explained later with reference to FIGS. 9 and 10.

Figure 3:
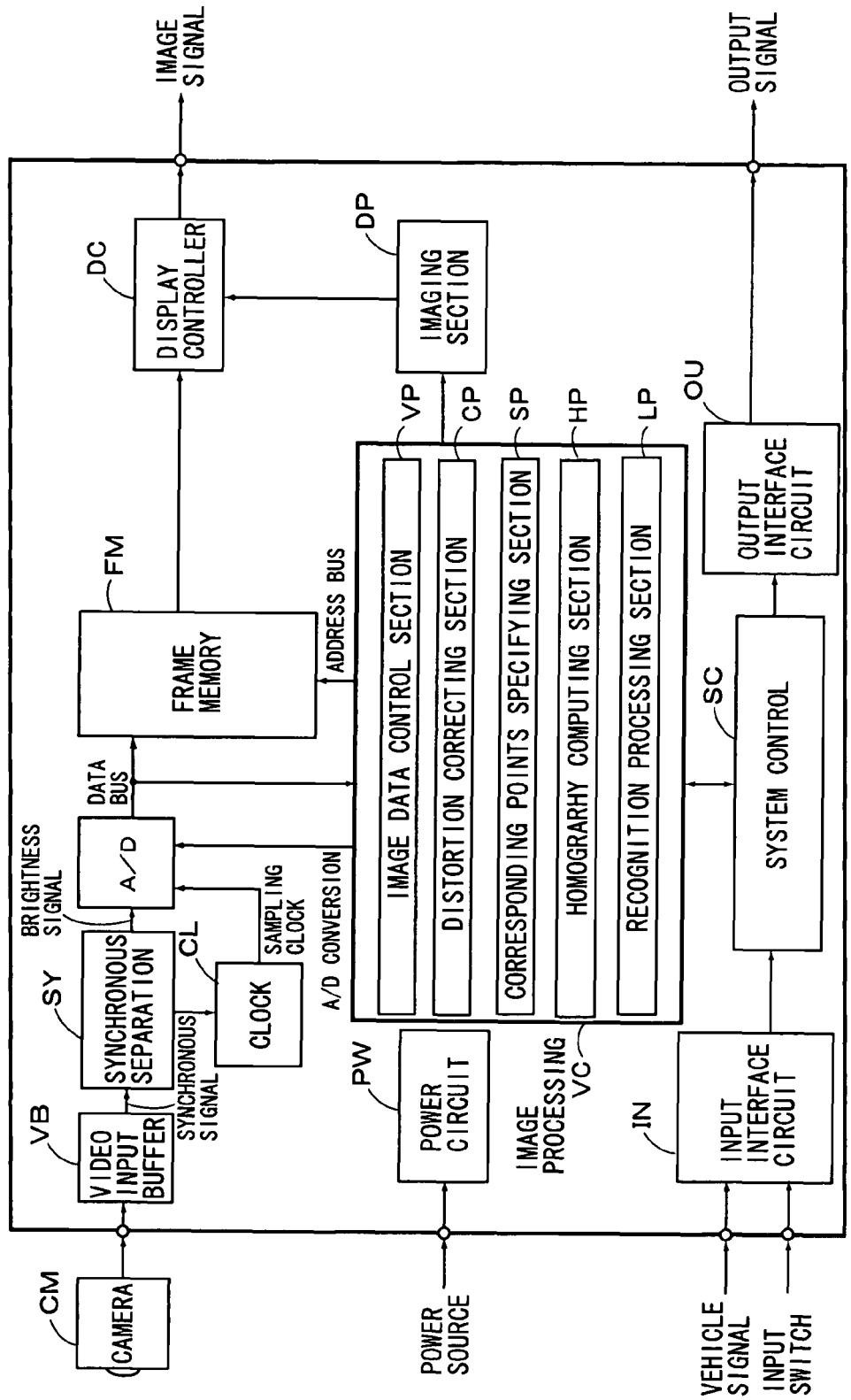
FIG. 3 is a block diagram showing an embodiment with image process of the present invention applied to a device for detecting a road traveling lane.

Furthermore, the above-described camera calibration device may be mounted on a vehicle, to apply an image display system for defining a circumstance around the vehicle, a system for recognizing a traveling lane, a system for detecting an obstacle, and the like, an example of which is shown in FIG. 3, as a practical example applied to a device for detecting a traveling lane on a road surface. According to the present embodiment, in front of or back of a vehicle which is not illustrated herein, a camera CM (e.g., CCD camera) CM is installed, for example, whereby images of the view in front of the vehicle including the road surface are picked up continuously. The image signals of the camera (CM) are converted from analogue signals to digital signals through a video input buffer circuit (VB) and synchronous separation circuit (SY), and stored in a frame memory (FM). The image data stored in the frame memory (FM) are processed by an image processing section (VC). The image processing section (VC) is constituted by image data control section (VP), distortion correcting section (CP), corresponding points specifying section (SP), homography computing section (HP), and recognition processing section (LP).

According to the image processing section (VC), the image data in the frame memory (FM) are addressed by the image data control section (VP), and sent to the distortion correcting section (CP), where a distortion correcting process is performed. On the image with the distortion corrected, the positions corresponding to the coordinate points of the targets to be used for calibration, which act as the aforementioned calibration indices, are detected by the corresponding points specifying section (SP) in a window (region of interest) called as ROI (Region of Interest), which is provided in advance.

Figure 5:
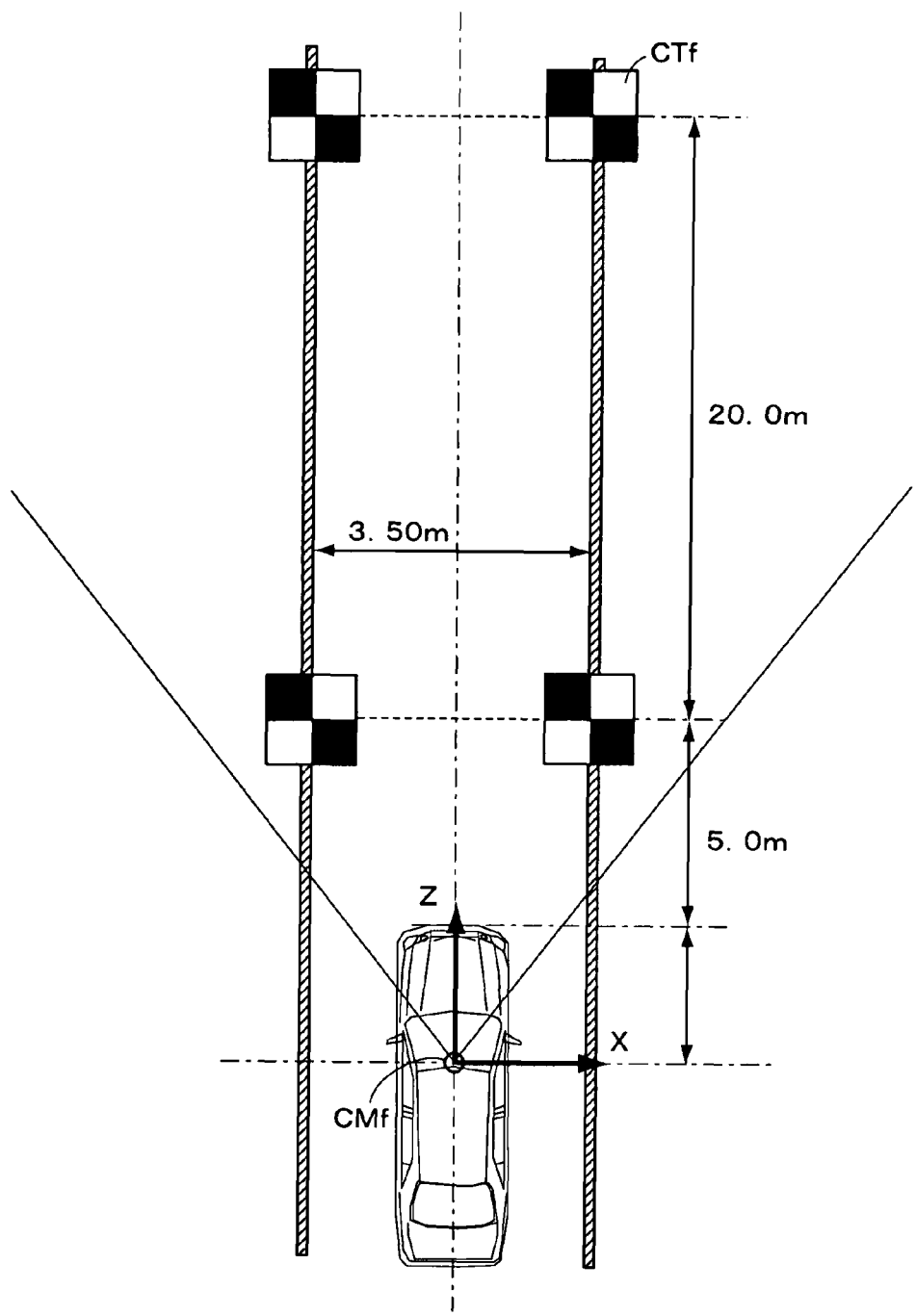
FIG. 5 is a plan view of an example of arranging targets to be used for calibration, for use in calibration indices of a front monitoring camera.

As the targets to be used for calibration are placed on the known positions as indicated in FIG. 5, for example, and the camera is mounted within a predetermined tolerance, the positions of the targets to be used for calibration on the image are approximately determined. Therefore, the position and size of the "ROI" are provided, considering a scope of the tolerance and a margin for the image processing.

Further, a corner detector (not shown) may be used for detecting the targets to be used for calibration (corresponding points on the image). As for the corner detector, well-known detectors in the image processing area (e.g., Tomasi-Kanabe detector, Harris detector or the like) can be employed.

Next, in the homography computing section (HP), correspondence between the image coordinates and the road surface coordinates are performed to each of four points of the targets to be used for calibration, as shown in the following [Table 1], and the result is applied to the aforementioned [Equation 19], so that the homography (H) is computed. Consequently, once the homography (H) is determined, arbitrary coordinates other than the following four points can be transformed.

TABLE 1

| | Target No. | | | |
|---|---|---|---|---|
| | 1 | 2 | 3 | 4 |
| Image coordinates | $(x_1, y_1)$ | $(x_2, y_2)$ | $(x_3, y_3)$ | $(x_4, y_4)$ |
| Road coordinates | $(X_1, Y_1)$ | $(X_2, Y_2)$ | $(X_3, Y_3)$ | $(X_4, Y_4)$ |

Then, in the recognition processing section (LP), a straight line approximating a position as a lane boundary is selected to be recognized as a road boundary line, i.e., the boundary line of the traveling lane, and the image data are output through an imaging section (DP) and a display controller (DC), whose processes do not directly relate to the present invention, so that the detailed explanation is omitted herein.

Figure 4:
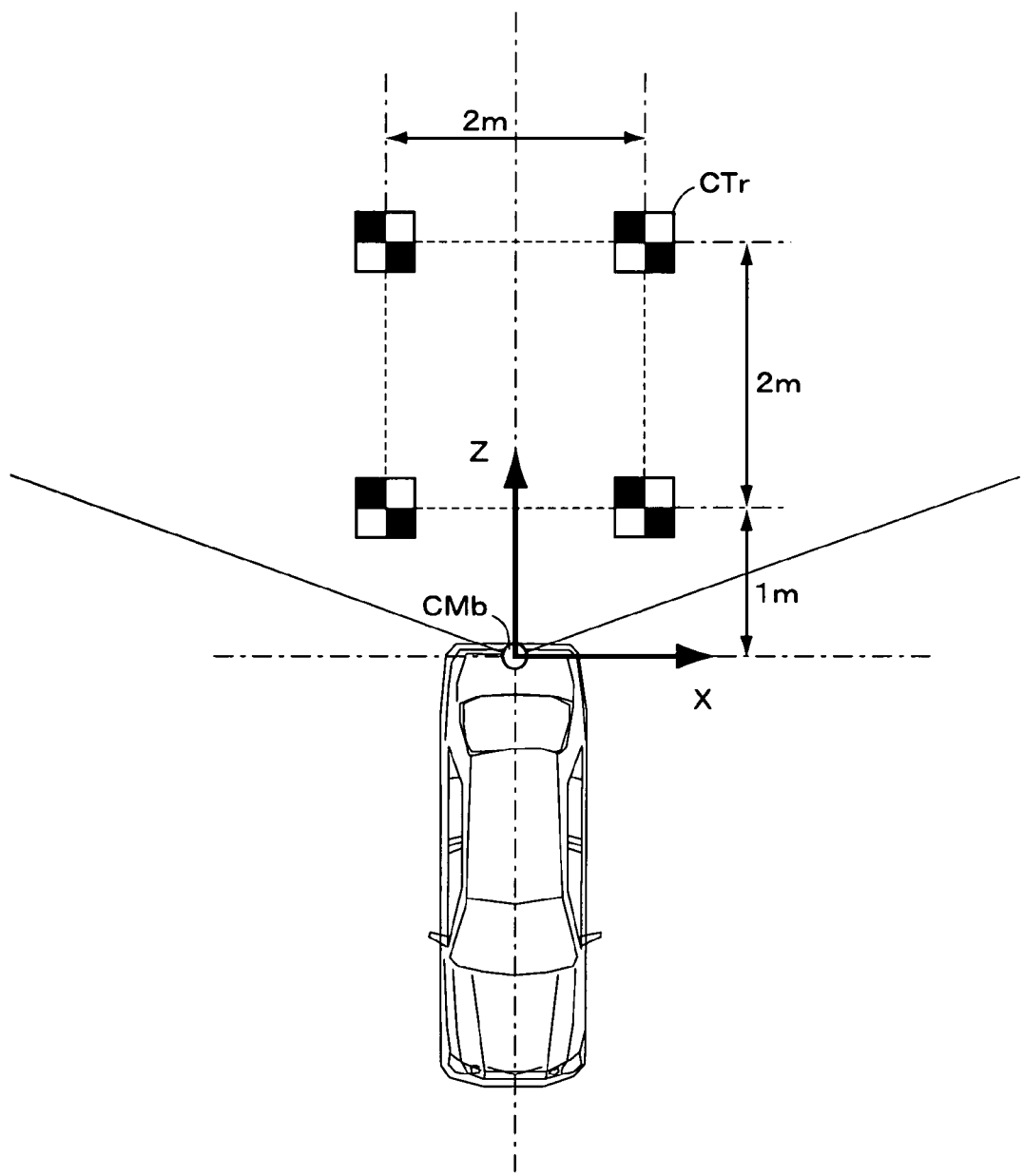
FIG. 4 is a plan view of an example of arranging targets to be used for calibration for use in calibration indices of a back monitoring camera to assist parking operation.

Next, as an example of the calibration indices, FIG. 4 shows an example of arranging targets to be used for calibration (represented by CTr), which are provided for use in the calibration indices of a back monitoring camera (CMr) to assist parking operation. Also, FIG. 5 shows an example of arranging targets to be used for calibration (represented by CTf), which are provided for use in the calibration indices of a front monitoring camera (CMf). The arrangements and sizes of those targets (CTf) or (CTr) to be used for calibration are set to be detected and confirmed easily on the image, because the size of each image of the targets to be used for calibration on the image will be varied, depending on resolution of the camera for taking them, or resolution of an image memory for inputting the camera image.

According to the present embodiment, the targets (CTf) or (CTr) to be used for calibration are arranged symmetrically with respect to a main axis (indicated by one-dot chain line in FIGS. 4 and 5) passing a center of the vehicle. As for the arrangements of these targets to be used for calibration, provided that the four points are known, they may be formed in any shapes of square, rectangle, or trapezoid, theoretically, and do not necessarily have to be symmetrical with respect to the main axis passing the center of the vehicle. In FIGS. 4 and 5, they are formed in the shape of rectangle, to simplify the explanation in view of easy understanding and easy working. In this case, it is required that four points of the targets to be used for calibration are known, i.e., the coordinates of the four points of the targets to be used for calibration in the coordinate system based on the vehicle have to be accurately known. However, in the case where the calibration indices are used in such a manner that the relationship in position relative to the own vehicle is not in issue, e.g., in the case where a top view image of a road surface is displayed, but it is not required to display where the vehicle is, it is sufficient that the coordinates of the four points are accurately known, so that the relationship of positions between the vehicle and the calibration indices do not have to be known.

Figure 6:
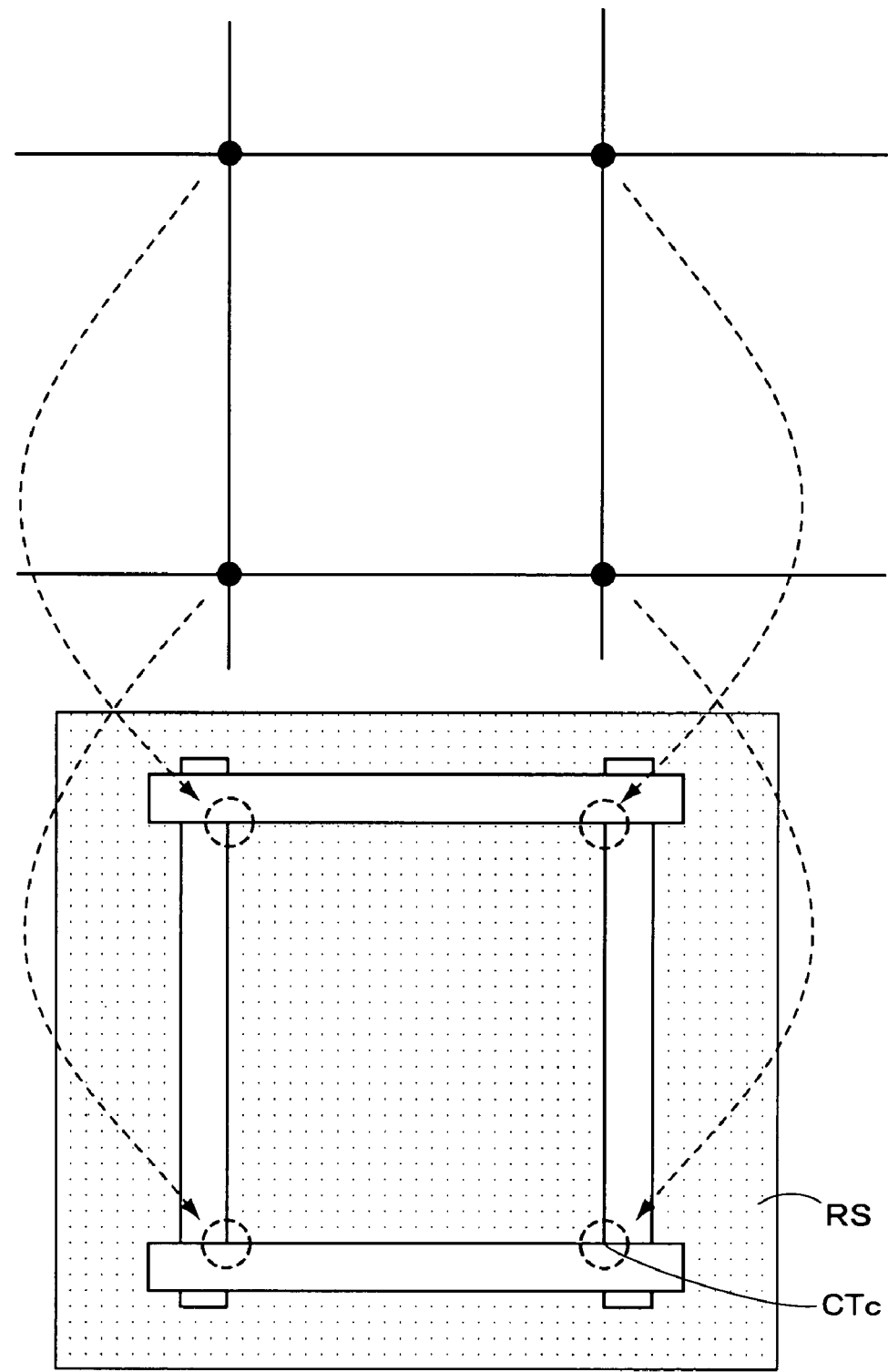
FIG. 6 is a plan view of target members to be used for calibration, which are formed to provide four points on a planar road surface to be correspondent to points of intersection of belt-like lines.
Figure 7:
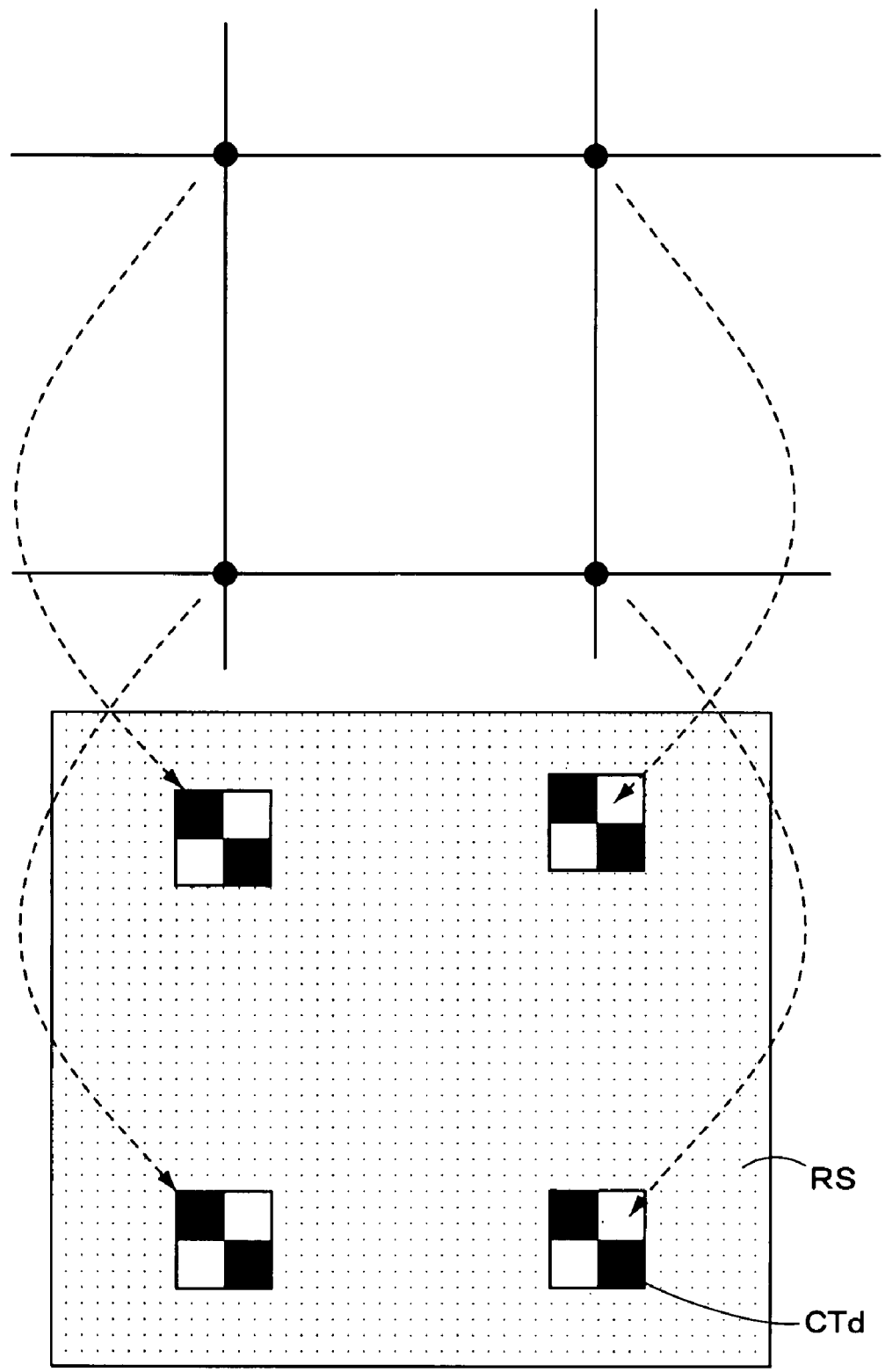
FIG. 7 is a plan view of target members to be used for calibration, which are formed to provide a diced pattern for four points on a planar road surface.
Figure 8:
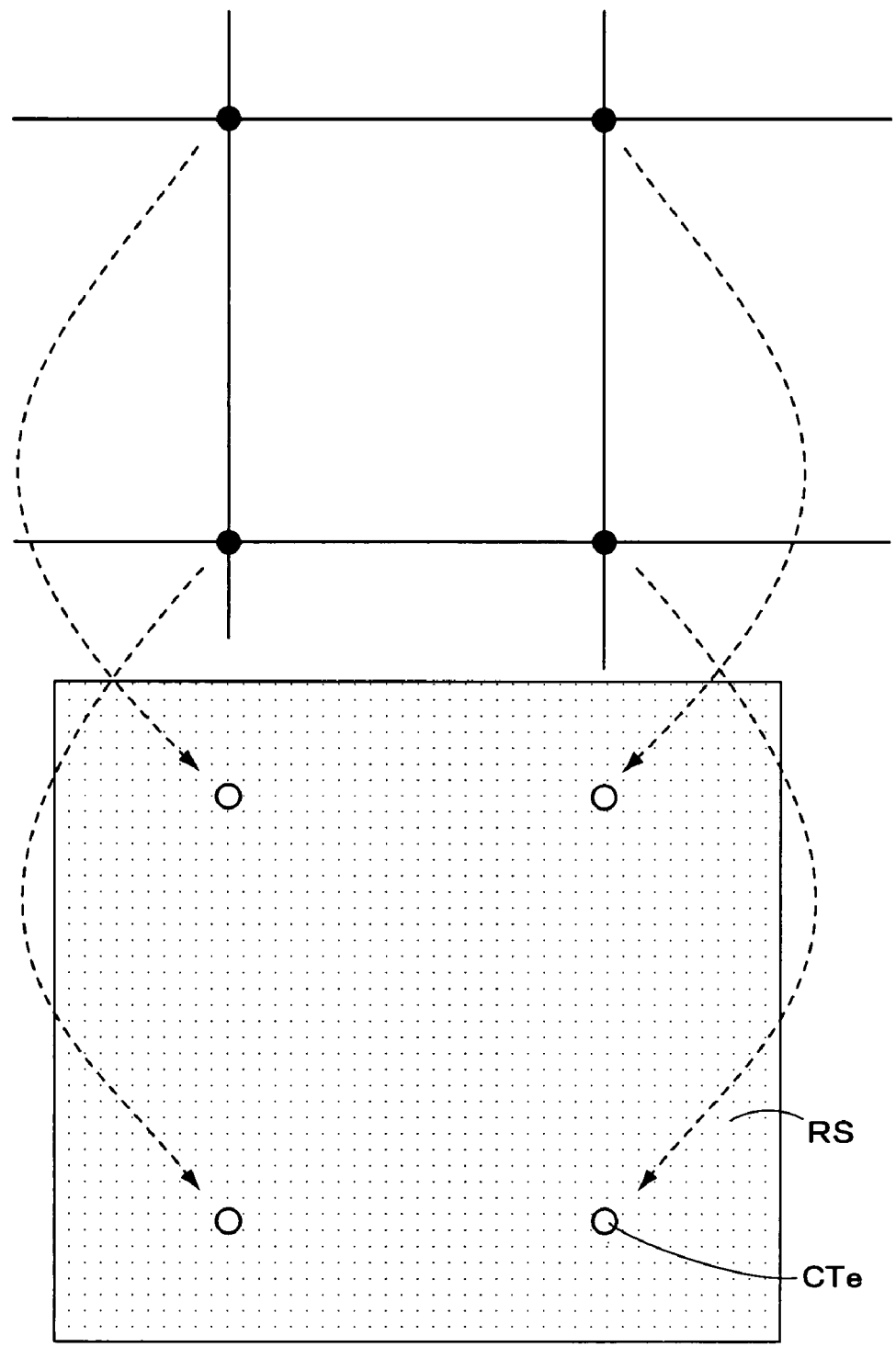
FIG. 8 is a plan view of target members to be used for calibration, which are small light sources embedded at four points on a planar road surface.

In practice, target members to be used for calibration as shown in FIGS. 6-8 are employed. In FIG. 6, it is so constituted that four points on a planar road surface (RS) correspond to intersections (CTc) of belt-like lines. In FIG. 7, it is so constituted that four points on the planar road surface (RS) are formed to provide a diced pattern (CTd). Furthermore, in FIG. 8, it is so constituted that small light sources (e.g., LED light sources) (CTe) are embedded at four points on the planar road surface (RS). These have been selected from a view point that coordinates of the positions having the known 3D coordinate information are easily specified on the camera image. Other target members to be used for calibration may be employed, provided that they are easily specified on the camera image.

Furthermore, referring to FIG. 3, it has been explained that the corner detector (not shown) may be used for detecting the targets to be used for calibration (corresponding points on the image). Instead, in the case where the targets to be used for calibration employing the belt-like lines as shown in FIG. 6, horizontal and vertical border lines may be detected to obtain coordinates of intersections of them. Or, in the case where small light sources (CTe) embedded on a plane as shown in FIG. 8 are employed, bright zones on the image may be detected to obtain their center of mass.

Figure 9:
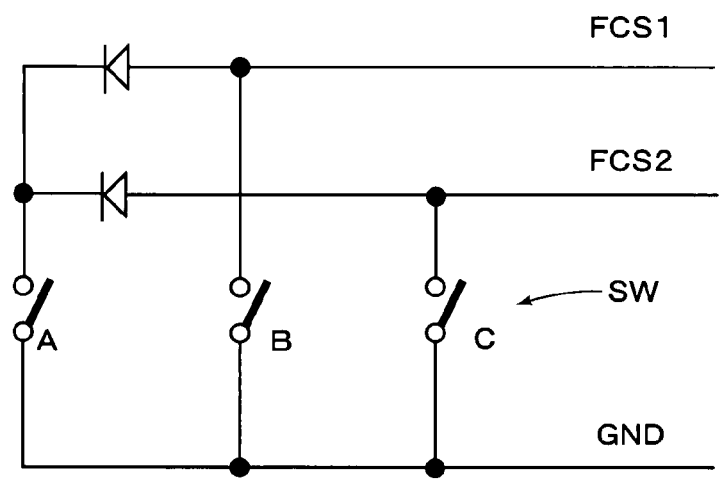
FIG. 9 is a circuit diagram showing an example of structure of an input switch.
Figure 10:
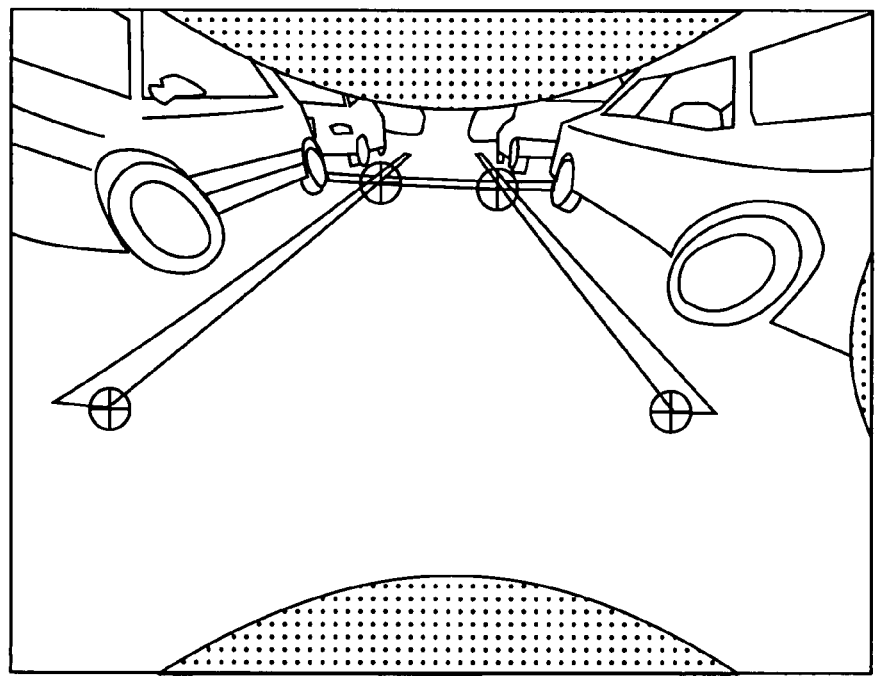
FIG. 10 is a front view of a state of manually detecting positions on an image corresponding to four points on targets to be used for calibration.

According to the embodiment as shown in FIG. 3, it relates to the method for automatically detecting the positions on the image corresponding to the four points on the targets to be used for calibration. Instead, they can be detected manually. For example, there is a method for adjusting a cursor displayed on the image to be placed on the positions of the targets to be used for calibration, to read their coordinates, an example of which is shown in FIG. 10. Therein, it is so constituted to employ points on four corners of white lines for defining a parking lot, which are displayed on the image with distortion corrected. Then, it is so constituted to move the cursor (not shown) on the image, by operating an input switch (SW) as shown in FIG. 9. As for the input switch (SW), push buttons of A-C are provided, as described in the Patent document 1, with a moving direction of the cursor being varied by the push button of (A), and with the cursor being moved by the push buttons of (B) and (C) in the forward direction or backward direction relative to the moving direction of the cursor at predetermined small steps, thereby to move the cursor vertically and laterally (in the drawing, FCS1 and FCS2 are signal terminals, and GND is an earth terminal). Consequently, the output image signals from the image controller (DC) as shown in FIG. 3 for example, are displayed on a monitor display (not shown), so that the position of the cursor can be moved, with the display being observed.

Figure 11:
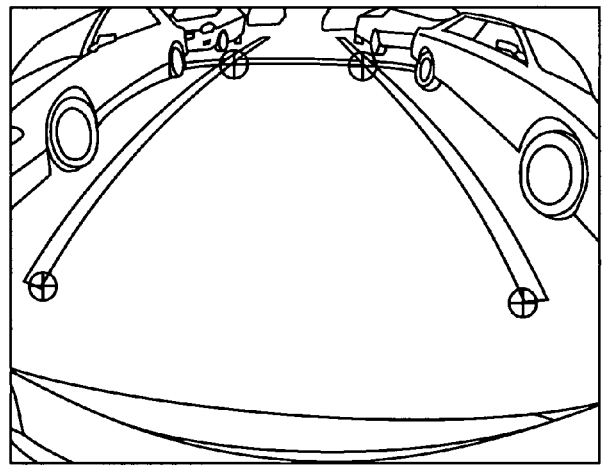
FIG. 11 is a front view of a state of distorted camera image, according to an embodiment with a camera calibration device of the present invention mounted on a vehicle.

Although the image with distortion corrected has been employed in FIG. 10 (therefore, stippled parts upward and downward in FIG. 10 are not camera images), it does not have to be employed. That is, since its distortion correction coefficient is known, and the coordinates with the distortion correction made thereto can be obtained, the image, which is used when the cursor displayed on the image is adjusted to be placed on the positions of the targets to be used for calibration, to read their coordinates, may be the one without the distortion correction being made, as shown in FIG. 11.

Figure 12:
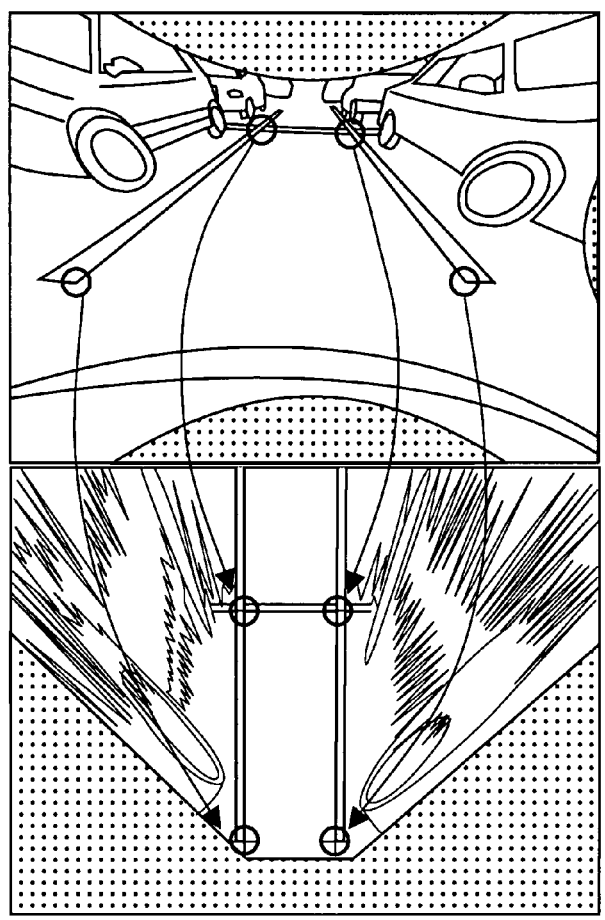
FIG. 12 is a front view of an image showing a state with a camera image is transformed to an image as viewed from the sky to detect a parking lot, according to an embodiment with a camera calibration device of the present invention mounted on a vehicle.

Then, as shown in the upper part of FIG. 12, if the four points on the four corners of the parking lot are detected on the image with distortion corrected as shown in FIG. 10, and the transformation is performed by the aforementioned homography (H) to match the four points with the original shape of the parking lot, then the original rectangular parking lot will be restored, as shown in the lower part of FIG. 12.

Figure 13:
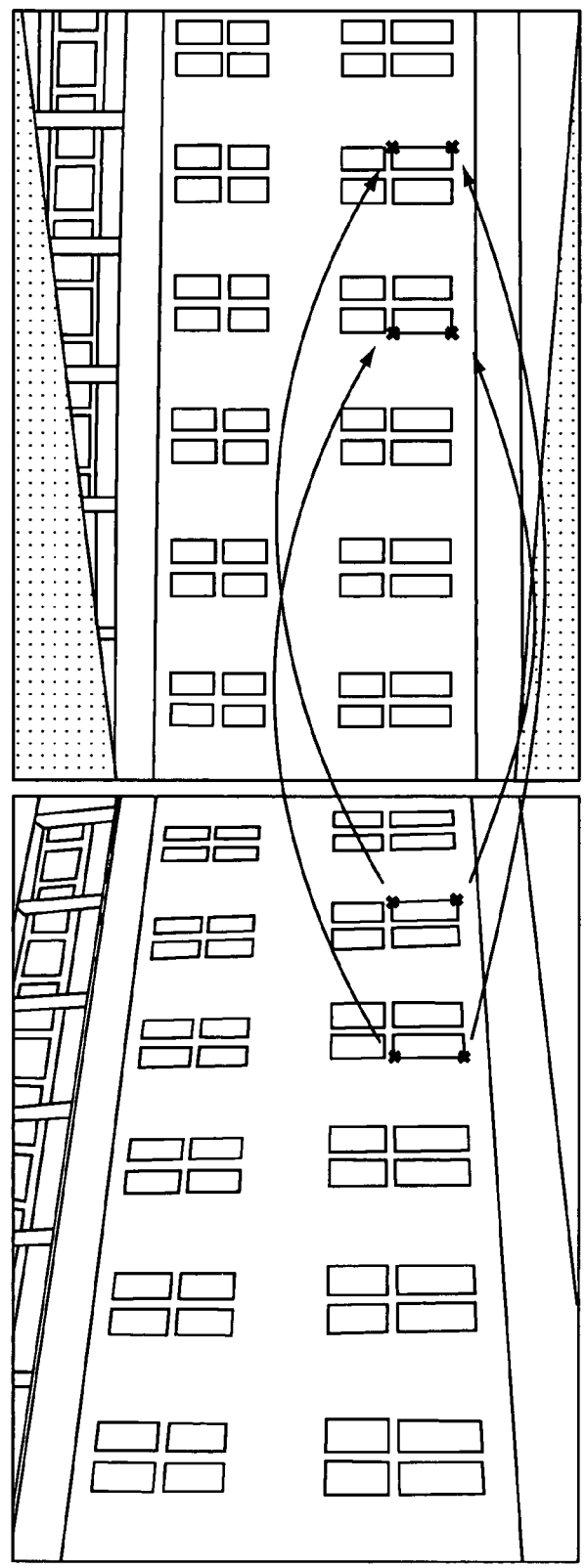
FIG. 13 is a diagram showing a result of experiment, wherein projective transformation was performed to an image of a building, as an embodiment with a camera calibration device of the present invention applied to calibration of a conventional camera image.

Next, other experimental examples transformed by the aforementioned homography (H) will be explained. The left part of FIG. 13 shows a building whose image was viewed diagonally, wherein originally rectangular four points were applied with the projective transform, to recover the rectangular shape, as shown in the right part of FIG. 13. This experiment is based on the image as shown on page 14 of the Non-patent document 5, and FIG. 13 illustrates the line drawing by simplifying the actual image, so that the stippled sections are not the actual image. As can be understood from FIG. 13, windows of the building are originally rectangular in shape, whereas four points of each window frame are obtained from the image, and they are transformed to recover their rectangular shape.

Figure 14:
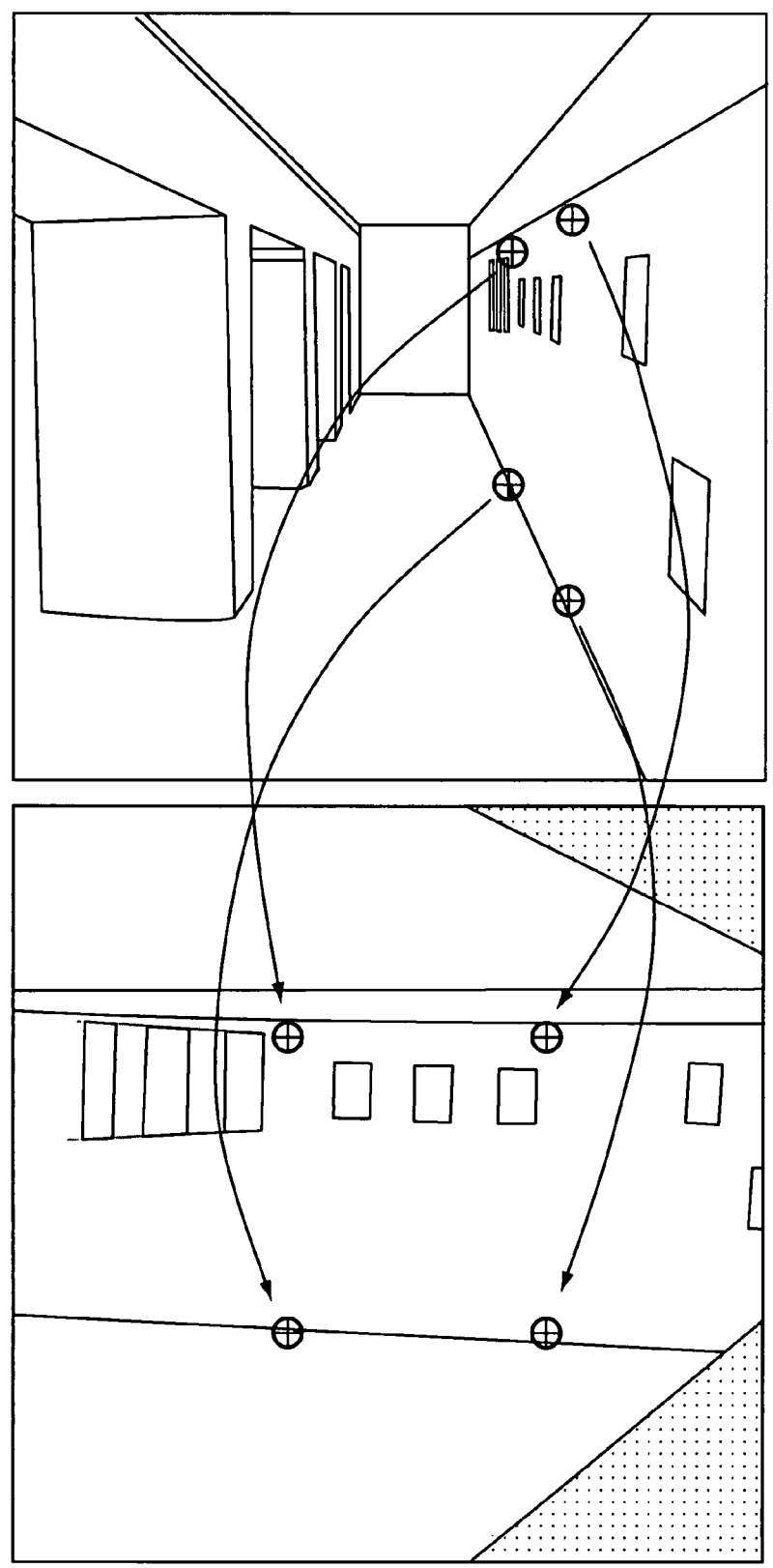
FIG. 14 is a diagram showing a result of experiment, wherein projective transformation was performed to a wall surface of a corridor, as an embodiment with a camera calibration device of the present invention applied to calibration of a conventional camera image.

Likewise, FIG. 14 illustrates an example of the experiment based on the image as shown in the Non-patent document 5. As shown in the upper part of FIG. 14, originally rectangular four points on the right wall surface of the corridor, whose image was viewed diagonally, in the image with depth, were applied with the projective transform, to recover the original rectangular shape, as shown in the lower part of FIG. 14.

Figure 15:
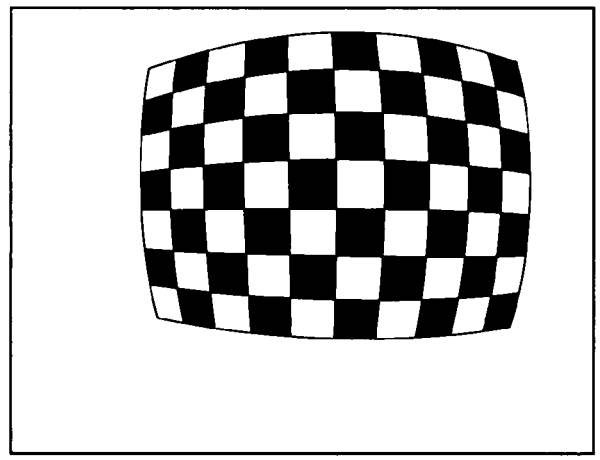
FIG. 15 is a plan view showing a state of distorted camera image with a diced pattern being taken, as an embodiment with a camera calibration device of the present invention applied to calibration of a conventional camera image.
Figure 16:
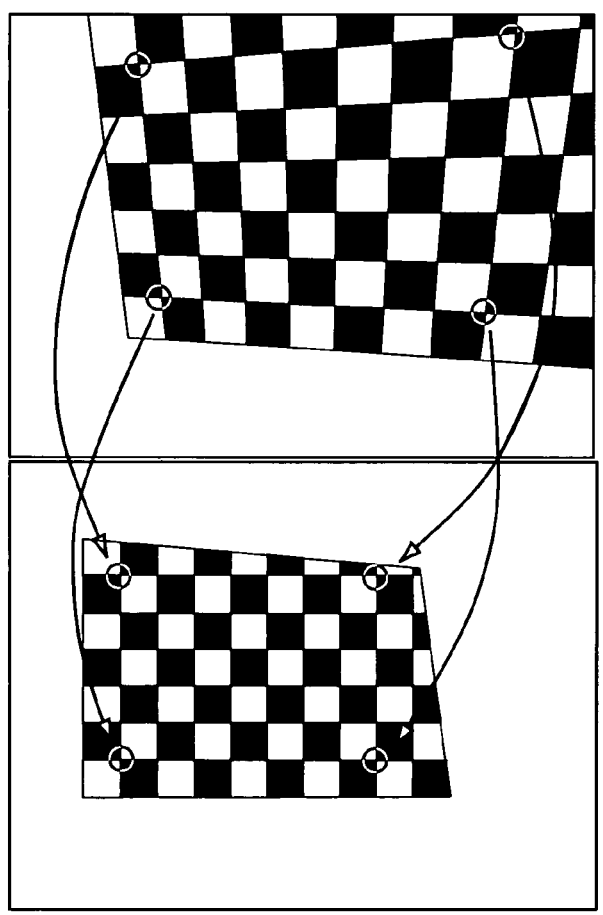
FIG. 16 is a diagram showing a result of experiment, wherein projective transformation was performed, after a correction of distortion had been made to the image in FIG. 15, as an embodiment with a camera calibration device of the present invention applied to calibration of a conventional camera image.

Furthermore, FIGS. 15 and 16 illustrate another experimental example, wherein a diced pattern with squares of known sizes being assembled was imaged to provide a camera image as shown in FIG. 15, to which the distortion correction was made, and then the projective transformation was performed. As shown in FIG. 16, originally rectangular four points have been recovered to provide the rectangular shape, as shown in the lower part of FIG. 16. According to each experiment as described above, operation using the aforementioned homography, on the basis of the principle that arbitrary four points on an image can be transformed into arbitrary four points on another image, without requiring any camera extrinsic parameters at all, so that the extrinsic parameters have not been employed. That is, when the camera calibration is performed, it is not required to calibrate the camera extrinsic parameters.

As described above, if arbitrary four points, whose intrinsic parameters are unknown (with distortion of image being corrected), and whose arrangement on a plane in 3D space has been known, are employed as the calibration indices, four points on a camera image can be recovered to provide the four points on the original plane in 3D space, by manually or automatically corresponding the four points on the camera image, which correspond to them, respectively, as described before. In this case, positioned and mounted states of a camera, e.g., camera extrinsic parameters (R) and (T), which correspond to the information of position and behavior of the camera in 3D space, such as the height and tilt angle or the like of the camera, are not required, and they may be unknown. Therefore, the positioning and mounting requirements of the camera will be eased, and transforming accuracy between the plane on 2D image and the plane in 3D space will be improved.

Furthermore, the present invention is not limited to the device mounted on the movable base like the vehicle as described above, but may be applied to various devices using camera images, to be capable of performing the camera calibration at high accuracy.

The invention claimed is:

1. In a camera calibration method for performing calibration to a camera image taken by a camera mounted on a movable base for projecting three-dimensional space onto two-dimensional image, the camera calibration method comprising
   placing planar calibration indices including actual coordinate information of at least four known points in a coordinate system based on said movable base, on a first plane in said three-dimensional space,
   inputting an image plane of said camera image including said calibration indices as a second plane,
   specifying points existing on said second plane and corresponding to predetermined portions of said calibration indices, and
   computing homography between said first plane and said second plane, on the basis of the corresponding relationship of said at least four points included commonly in said first plane and said second plane, wherein the homography is computed based on the relationship between the actual coordinate information and said camera image without using intrinsic and extrinsic parameters of the camera,
   obtaining a transforming relationship between the coordinate on said first plane in said three-dimensional space and the image coordinate on said second plane corresponding to the plane of said two-dimensional image, on the basis of the homography, and
   calibrating the camera image on the basis of the transforming relationship.

2. A camera calibration method as described in claim 1, wherein at least one of specific marks and straight line patterns are placed on said first plane, to provide said calibration indices.

3. A camera calibration method as described in claim 1, wherein the points corresponding to the predetermined portions of said calibration indices are specified by means of at least one of straight lines, intersections, and a combination of the straight lines and intersections.

4. In a camera calibration device for performing calibration to a camera image taken by a camera mounted on a movable base for projecting three-dimensional space onto two-dimensional image, the camera calibration device comprising:
   calibration index means for placing planar calibration indices including actual coordinate information of at least four known points in a coordinate system based on said movable base, on a first plane in said three-dimensional space;
   image input means for inputting an image plane of said camera image including said calibration indices as a second plane;
   corresponding points specifying means for specifying points existing on said second plane and corresponding to predetermined portions of said calibration indices; and
   homography computing means for computing homography between said first plane and said second plane, on the basis of the corresponding relationship of said at least four points included commonly in said first plane and said second plane, wherein the homography is computed based on the relationship between the actual coordinate information and said camera image without using intrinsic and extrinsic parameters of the camera,
   wherein all of said means are mounted on said movable base together with said camera, and wherein a transforming relationship between the coordinate on said first plane in said three-dimensional space and the image coordinate on said second plane corresponding to the plane of said two-dimensional image is obtained, on the basis of the homography, to calibrate the camera image on the basis of the transforming relationship.

5. A camera calibration device as described in claim 4, wherein said calibration index means places at least one of specific marks and straight line patterns on said first plane, to provide said calibration indices.

6. A camera calibration device as described in claim 4, wherein said corresponding points specifying means specifies the points corresponding to the predetermined portions of said calibration indices by means of at least one of straight lines, intersections, and a combination of the straight lines and intersections.

7. A camera calibration device as described in claim 4, wherein said camera, said image input means, said corresponding points specifying means, and said homography computing means are mounted on a vehicle.

8. In a camera calibration device for performing calibration to a camera image taken by a camera mounted on a movable base for projecting three-dimensional space onto two-dimensional image, the camera calibration device comprising:
   calibration index means for placing planar calibration indices including actual coordinate information of at least four known points in a coordinate system based on said movable base, on a first plane in said three-dimensional space;
   display means for displaying an image plane of said camera image including said calibration indices as a second plane;
   marker display means for superimposing predetermined markers on said display means;
   adjusting means for varying the position of said marker display means on the image coordinate taken by said camera, said adjusting means adjusting the positions of said markers to be matched with predetermined portions of said calibration indices;
   corresponding points specifying means for specifying the points corresponding to the predetermined portions on said first plane within said second plane, when said markers are matched with said calibration indices; and homography computing means for computing homography between said first plane and said second plane, on the basis of the corresponding relationship of said at least four points included commonly in said first plane and said second plane, wherein the homography is computed based on the relationship between the actual coordinate information and said camera image without using intrinsic and extrinsic parameters of the camera, wherein all of said means are mounted on said movable base together with said camera, and wherein a transforming relationship between the coordinate on said first plane in said three-dimensional space and the image coordinate on said second plane corresponding to the plane of said two-dimensional image is obtained, on the basis of the homography, to calibrate the camera image on the basis of the transforming relationship.

9. A camera calibration device as described in claim 8, wherein said camera is mounted on said vehicle, and wherein said calibration indices are placed on left and right sides with respect to a main axis passing a center of said vehicle.

10. A camera calibration device as described in claim 9, wherein said calibration indices include known four points on a coordinate system based on said vehicle.

11. A camera calibration device as described in claim 10, wherein said calibration indices provide said four points to form diced patterns on said first plane.

12. A camera calibration device as described in claim 10, wherein said calibration indices include light sources disposed at said four points on said first plane.

13. A camera calibration device as described in claim 9, wherein said calibration indices include four points provided at four corners of a parking lot for parking said vehicle.

14. A camera calibration method as described in claim 1, wherein said movable base is a vehicle, and said first plane is a road surface.

15. A camera calibration method as described in claim 4, wherein said movable base is a vehicle, and said first plane is a road surface.

16. A camera calibration method as described in claim 8, wherein said movable base is a vehicle, and said first plane is a road surface.

17. The camera calibration method as described in claim 1, wherein the at least four points are obtained according to the following equations:

$$x' = \frac{x'_1}{x'_3} = \frac{h_{11}x + h_{12}y + h_{13}}{h_{31}x + h_{32}y + h_{33}}, \quad y' = \frac{x'_2}{x'_3} = \frac{h_{21}x + h_{22}y + h_{23}}{h_{31}x + h_{32}y + h_{33}}$$

$$x'(h_{31}x + h_{32}y + h_{33}) = h_{11}x + h_{12}y + h_{13}$$

$$y'(h_{31}x + h_{32}y + h_{33}) = h_{21}x + h_{22}y + h_{23}.$$

18. The camera calibration method as described in claim 4, wherein the at least four points are obtained according to the following equations:

$$x' = \frac{x'_1}{x'_3} = \frac{h_{11}x + h_{12}y + h_{13}}{h_{31}x + h_{32}y + h_{33}}, \quad y' = \frac{x'_2}{x'_3} = \frac{h_{21}x + h_{22}y + h_{23}}{h_{31}x + h_{32}y + h_{33}}$$

$$x'(h_{31}x + h_{32}y + h_{33}) = h_{11}x + h_{12}y + h_{13}$$

$$y'(h_{31}x + h_{32}y + h_{33}) = h_{21}x + h_{22}y + h_{23}.$$

19. The camera calibration method as described in claim 8, wherein the at least four points are obtained according to the following equations:

$$x' = \frac{x'_1}{x'_3} = \frac{h_{11}x + h_{12}y + h_{13}}{h_{31}x + h_{32}y + h_{33}}, \quad y' = \frac{x'_2}{x'_3} = \frac{h_{21}x + h_{22}y + h_{23}}{h_{31}x + h_{32}y + h_{33}}$$

$$x'(h_{31}x + h_{32}y + h_{33}) = h_{11}x + h_{12}y + h_{13}$$

$$y'(h_{31}x + h_{32}y + h_{33}) = h_{21}x + h_{22}y + h_{23}.$$

* * * * *